(12) United States Patent
Negron (10) Patent No.: US 11,607,071 B1
(45) Date of Patent: Mar. 21, 2023

(54) PORTABLE COFFEE BREWER

(71) Applicant: Walter Negron, Pawtucket, RI (US)

(72) Inventor: Walter Negron, Pawtucket, RI (US)

(*) Notice: Subject to any disclaimer, the term of this patent is extended or adjusted under 35 U.S.C. 154(b) by 452 days.

(21) Appl. No.: 16/813,908

(22) Filed: Mar. 10, 2020

(51) Int. Cl.
| A47J 31/00 | (2006.01) |
| A47J 31/44 | (2006.01) |
| A47J 31/46 | (2006.01) |
| A47J 31/54 | (2006.01) |
| A47J 31/52 | (2006.01) |

(52) U.S. Cl.
CPC ......... *A47J 31/005* (2013.01); *A47J 31/4407* (2013.01); *A47J 31/4457* (2013.01); *A47J 31/461* (2018.08); *A47J 31/462* (2013.01); *A47J 31/5253* (2018.08); *A47J 31/5255* (2018.08); *A47J 31/545* (2013.01)

(58) Field of Classification Search
CPC .... A47J 31/005; A47J 31/461; A47J 31/5253; A47J 31/5255; A47J 31/4407; A47J 31/4457; A47J 31/462; A47J 31/545; A47J 31/0615; A47J 43/046
See application file for complete search history.

(56) References Cited

U.S. PATENT DOCUMENTS

| 4,382,402 A | 5/1983 | Alvarez |
| 4,674,400 A | 6/1987 | Rondel |
| 8,127,664 B2 | 3/2012 | Nielsen |
| 10,219,647 B2 | 3/2019 | Richardson |
| 2005/0199130 A1* | 9/2005 | Palese ................. A47J 31/005 99/279 |
| 2007/0101868 A1* | 5/2007 | Porter ................. A47J 31/005 99/275 |
| 2008/0223739 A1* | 9/2008 | Thompson ......... A47G 19/2227 206/217 |
| 2013/0312617 A1 | 11/2013 | Toporovsky |
| 2015/0257586 A1 | 9/2015 | DiNucci |
| 2015/0366395 A1* | 12/2015 | Do ..................... A47J 31/0615 99/323 |
| 2016/0058242 A1 | 3/2016 | Viet-Doan |
| 2016/0360917 A1* | 12/2016 | Richardson ........... A47J 31/005 |
| 2016/0367072 A1 | 12/2016 | Boone |
| 2017/0280915 A1* | 10/2017 | Boone ................. A47J 43/046 |
| 2018/0139979 A1 | 5/2018 | Glynn |

* cited by examiner

*Primary Examiner* — Brian W Jennison
(74) *Attorney, Agent, or Firm* — Kyle A. Fletcher, Esq.

(57) ABSTRACT

The portable coffee brewer is configured for use in brewing coffee. The portable coffee brewer comprises a containment pan, a brewing pan, a lid structure, and a control circuit. The lid structure and the containment pan attach to the brewing pan. The control circuit mounts in the brewing pan. The control circuit controls the operation of the portable coffee brewer. The lid structure encloses the brewing pan. The containment pan contains accessories associated with the brewing and consumption of beverages. The beverage pan forms the space within which the beverage is brewed. The control circuit heats and circulates a fluid stored within the beverage pan for the purpose of preparing the beverage for consumption.

19 Claims, 6 Drawing Sheets

PORTABLE COFFEE BREWER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of domestic appliances including apparatus for making beverages, more specifically, a portable beverage making apparatus. (A47J31/005)

SUMMARY OF INVENTION

The portable coffee brewer is configured for use in brewing coffee. The portable coffee brewer comprises a containment pan, a brewing pan, a lid structure, and a control circuit. The lid structure and the containment pan attach to the brewing pan. The control circuit mounts in the brewing pan. The control circuit controls the operation of the portable coffee brewer. The lid structure encloses the brewing pan. The containment pan contains accessories associated with the brewing and consumption of beverages. The beverage pan forms the space within which the beverage is brewed. The control circuit heats and circulates a fluid stored within the beverage pan for the purpose of preparing the beverage for consumption. This disclosure assumes for the purposes of simplicity and clarity that the beverage is coffee. Those skilled in the art will recognize that the portable coffee brewer can be adaptable for use with other beverages without undue experimentation.

These together with additional objects, features and advantages of the portable coffee brewer will be readily apparent to those of ordinary skill in the art upon reading the following detailed description of the presently preferred, but nonetheless illustrative, embodiments when taken in conjunction with the accompanying drawings.

In this respect, before explaining the current embodiments of the portable coffee brewer in detail, it is to be understood that the portable coffee brewer is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the portable coffee brewer.

It is therefore important that the claims be regarded as including such equivalent construction insofar as they do not depart from the spirit and scope of the portable coffee brewer. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
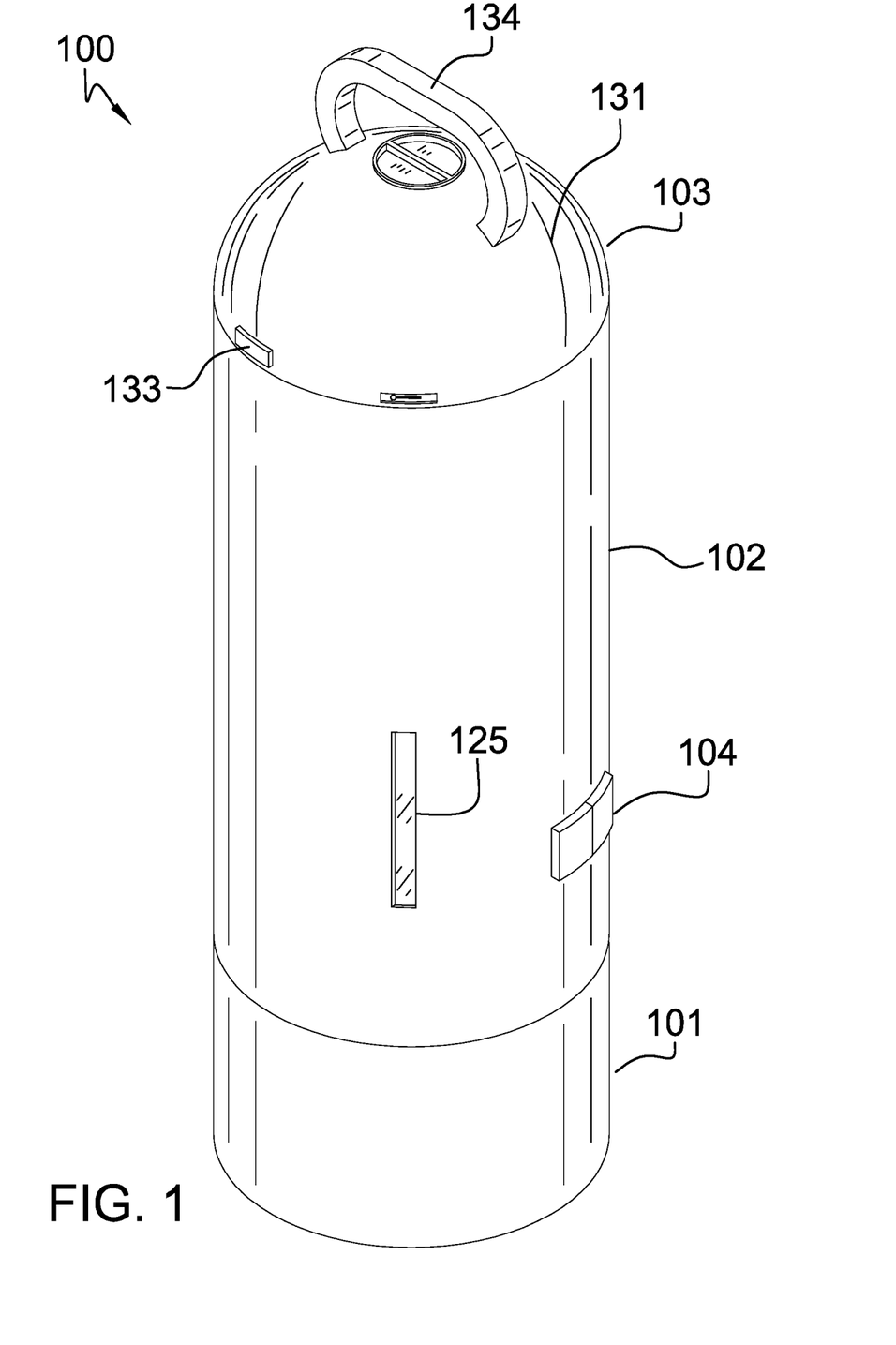
FIG. 1 is a perspective view of an embodiment of the disclosure.
Figure 2:
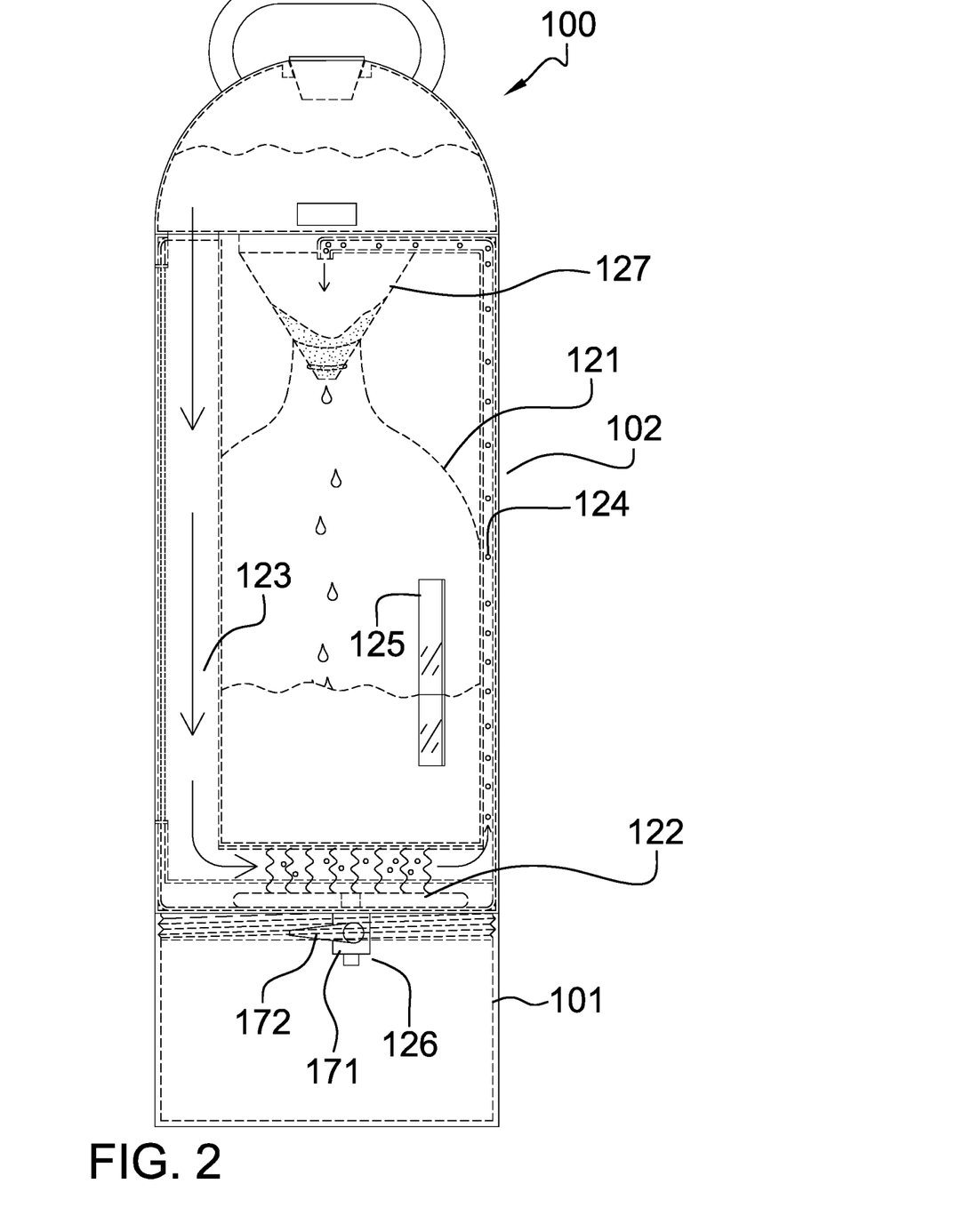
FIG. 2 is a front view of an embodiment of the disclosure.
Figure 3:
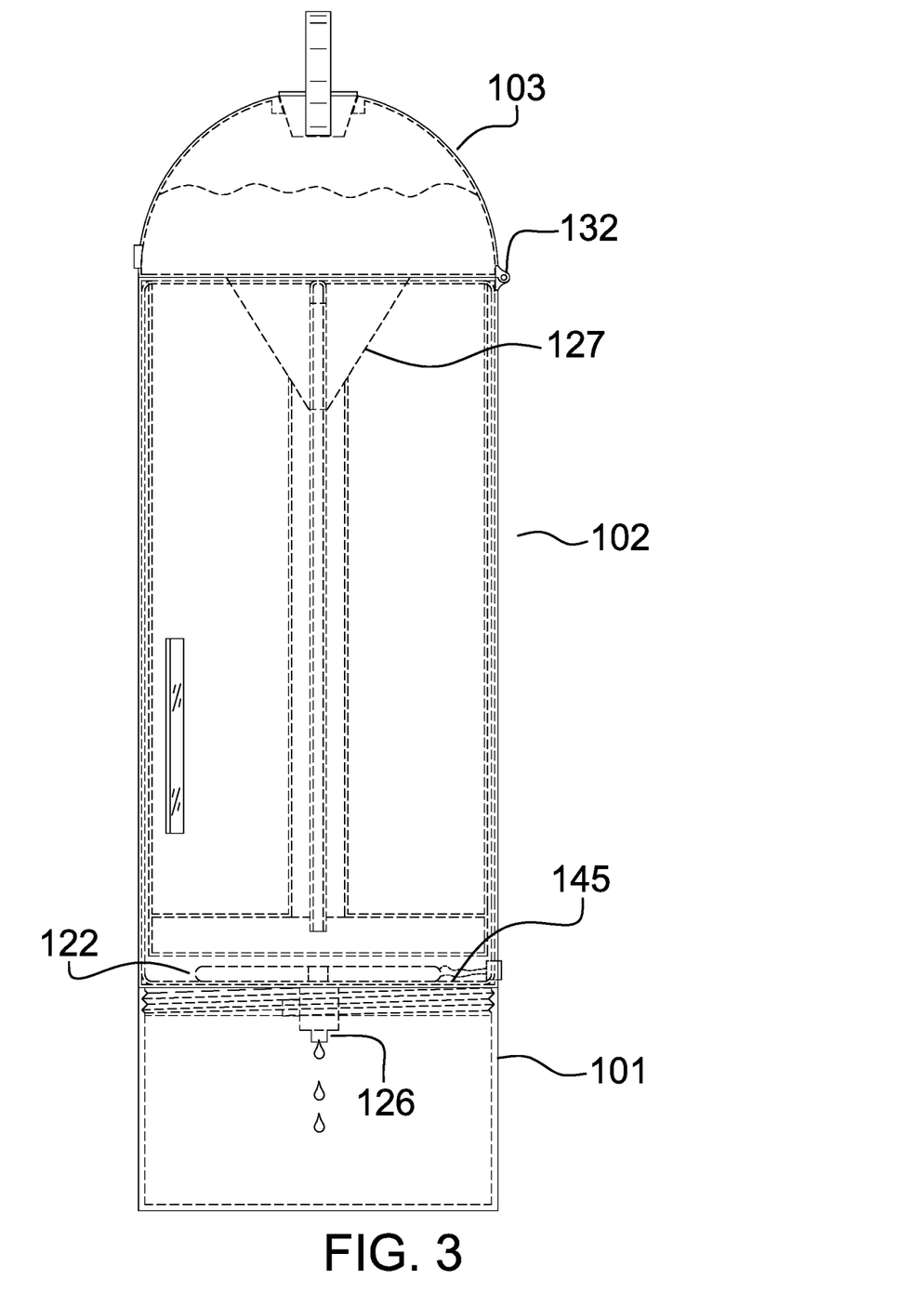
FIG. 3 is a side view of an embodiment of the disclosure.
Figure 4:
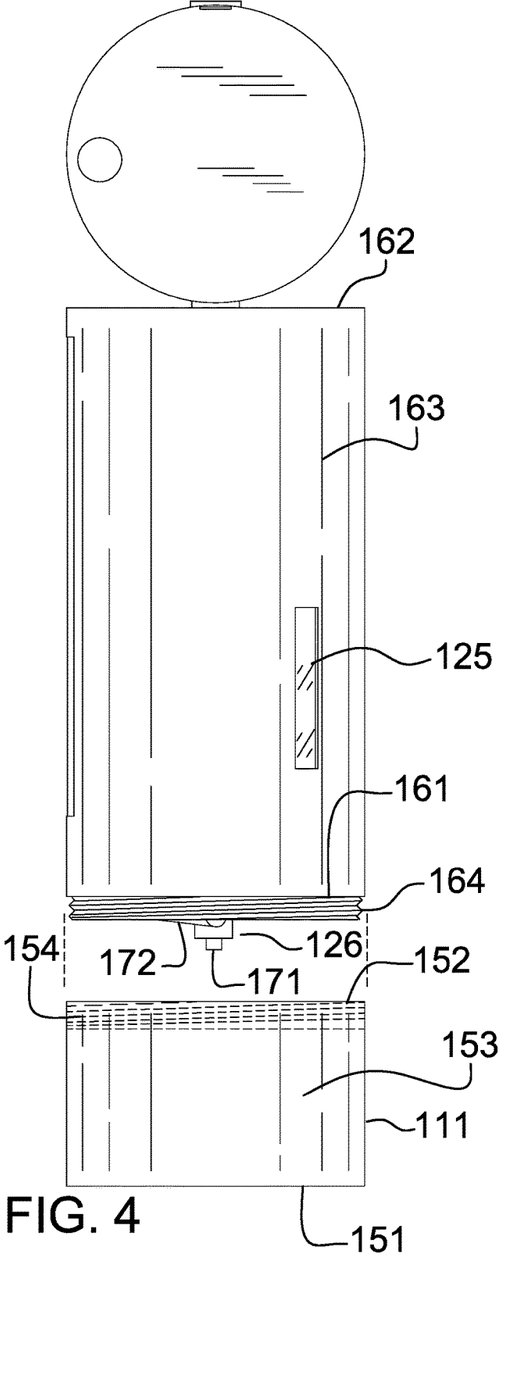
FIG. 4 is an exploded view of an embodiment of the disclosure.
Figure 5:
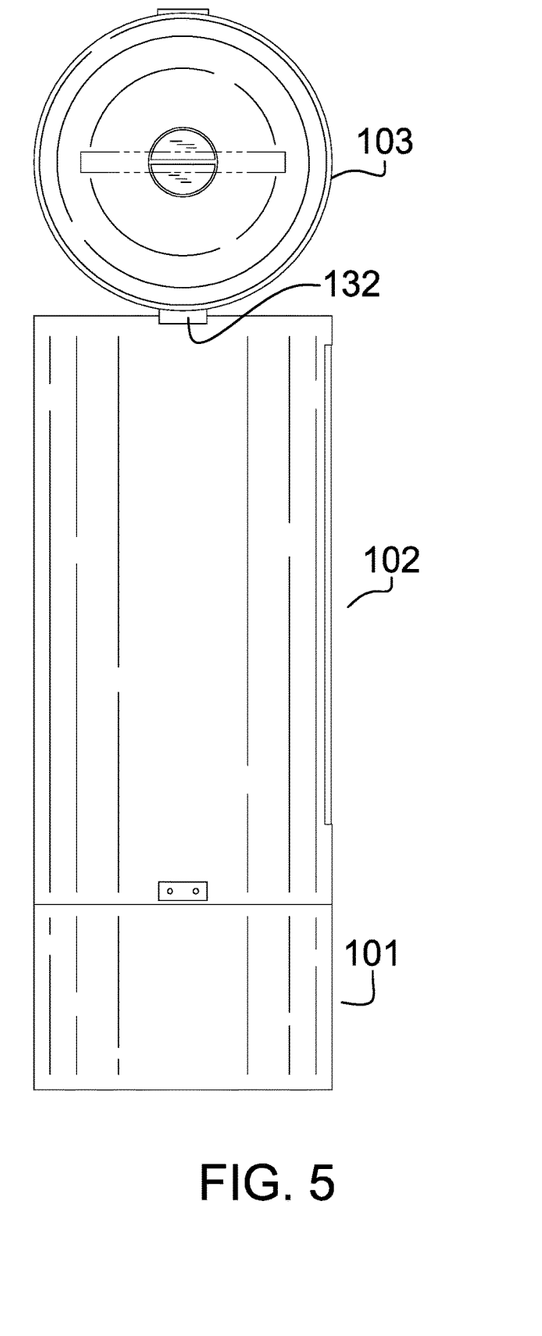
FIG. 5 is a rear view of an embodiment of the disclosure.
Figures 6, 7:
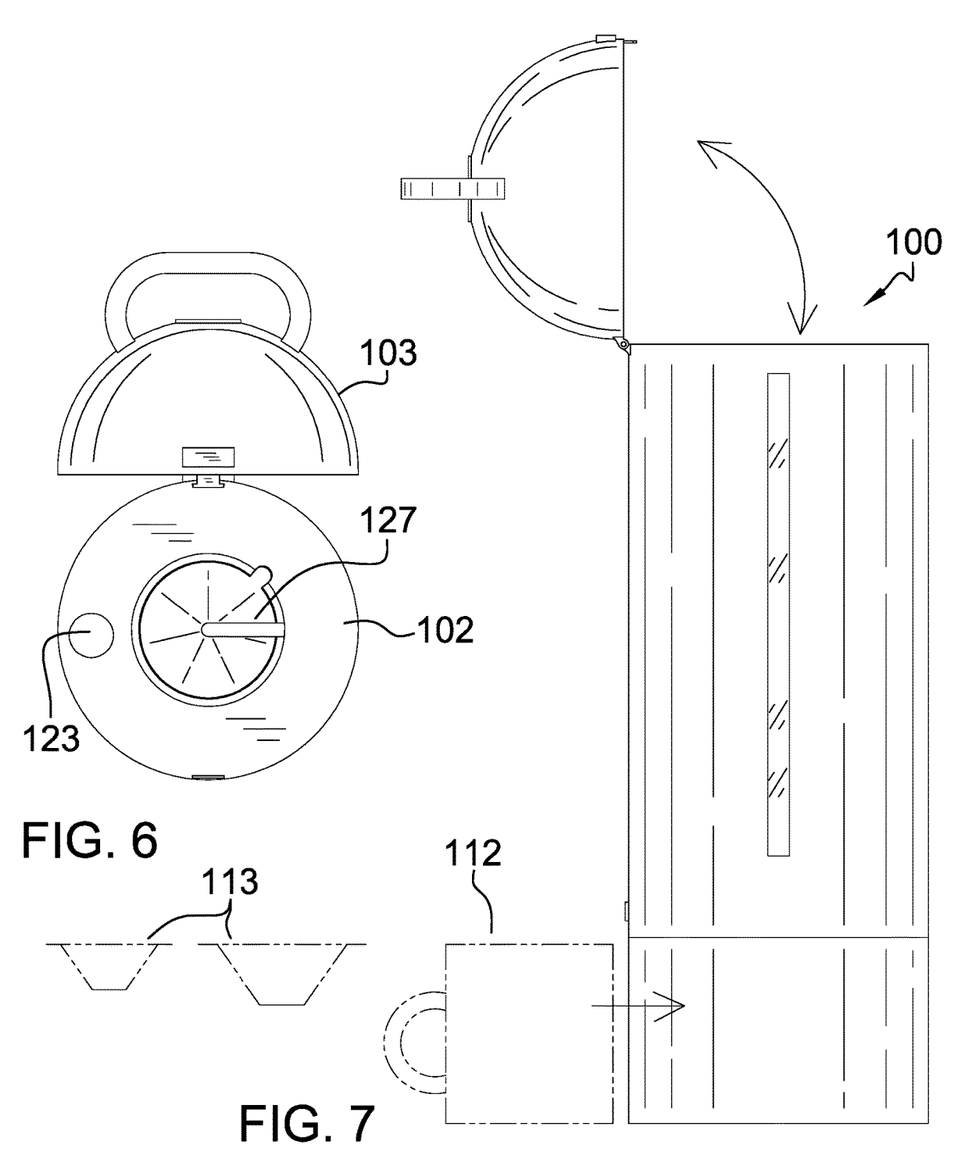
FIG. 6 is a top view of an embodiment of the disclosure.
FIG. 7 is an in-use view of an embodiment of the disclosure.
Figure 8:
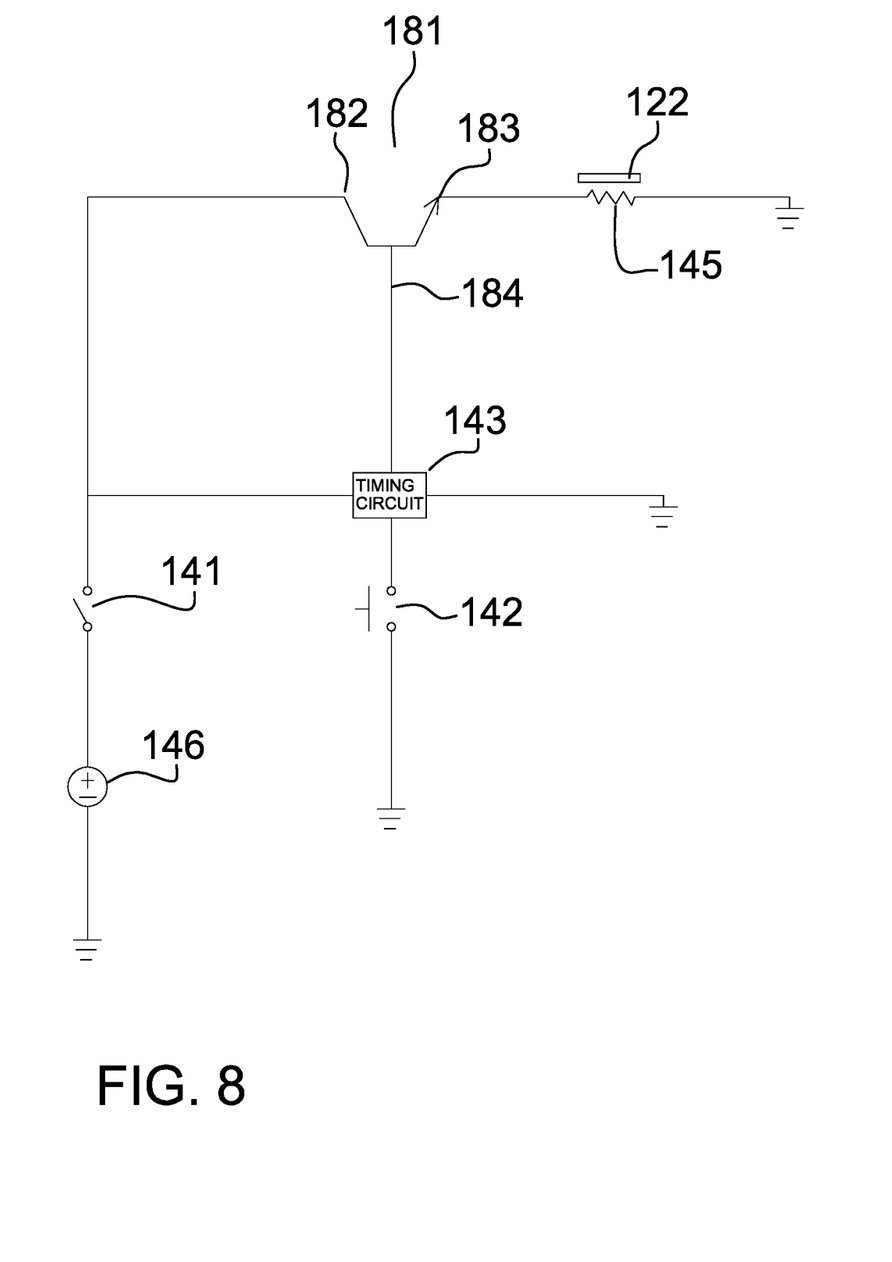
FIG. 8 is a schematic view of an embodiment of the disclosure.

Detailed reference will now be made to one or more potential embodiments of the disclosure, which are illustrated in FIGS. 1 through 8.

The portable coffee brewer 100 (hereinafter invention) is configured for use in brewing coffee. The invention 100 comprises a containment pan 101, a brewing pan 102, a lid structure 103, and a control circuit 104. The lid structure 103 and the containment pan 101 attach to the brewing pan 102. The control circuit 104 mounts in the brewing pan 102. The control circuit 104 controls the operation of the invention 100. The lid structure 103 encloses the brewing pan 102. The containment pan 101 contains accessories associated with the brewing and consumption of beverages. The beverage pan forms the space within which the beverage is brewed. The control circuit 104 heats and circulates a fluid stored within the beverage pan for the purpose of preparing the beverage for consumption. This disclosure assumes for the purposes of simplicity and clarity that the beverage is coffee. Those skilled in the art will recognize that the invention 100 can be adaptable for use with other beverages without undue experimentation.

The containment pan 101 is a prism-shaped structure. The containment pan 101 has a capped tube structure. The containment pan 101 forms a containment space in the invention 100 used to store accessories. The containment pan 101 attaches to the brewing pan 102 using a threaded connection. The threaded connection is defined elsewhere in this disclosure. The containment pan 101 comprises a first capped tube 111, a collapsible cup 112, and an accessory set 113.

The first capped tube 111 is a prism-shaped structure. The first capped tube 111 has a capped tube structure. The first capped tube 111 forms the physical containment space of the containment pan 101. The first capped tube 111 contains the collapsible cup 112 and the accessory set 113. The first capped tube 111 comprises a first closed end 151, a first open end 152, a first one or more lateral faces 153, and an interior screw thread 154.

The first closed end 151 is the closed end of the first capped tube 111. The first open end 152 is the open end of the first capped tube 111. The first one or more lateral faces 153 form the lateral face of the prism structure of the first capped tube 111. The interior screw thread 154 forms a portion of the threaded connection that joins the containment pan 101 to the brewing pan 102. The interior screw thread 154 is formed on the interior surface of the first one or more lateral faces 153 of the first capped tube 111 at a position proximal to the first open end 152.

The collapsible cup 112 is a cup. The collapsible cup 112 is configured for use in consuming the beverage brewed by the invention 100. The collapsible cup 112 is collapsible such that the volume of the collapsible cup 112 is reducible before storage in the containment pan 101.

The accessory set 113 is a collection of items commonly used for brewing a beverage. The accessory set 113 is contained within the first capped tube 111. Examples of items contained in the accessory set 113 include, but are not limited to, organic substances providing extractable substances, sweeteners, and stirring equipment.

The brewing pan 102 is a prism-shaped structure. The brewing pan 102 has a capped tube structure. The brewing pan 102 is a fluid impermeable structure. The brewing pan 102 is geometrically similar to the containment pan 101. The containment pan 101 attaches to the brewing pan 102 to form a composite prism structure. The brewing pan 102 forms the mechanical structure required to brew the beverage. The brewing pan 102 stores the brewed beverage for subsequent dispensing. The brewing pan 102 comprises a carafe 121, a heating plate 122, a feed tube 123, a heating tube 124, a sight glass 125, a dispensing valve 126, and a filter pan 127.

The carafe 121 is a prism-shaped structure. The carafe 121 has a capped tube structure. The carafe 121 forms the physical containment space of the brewing pan 102. The carafe 121 is a fluid impermeable structure. The carafe 121 contains the beverage during the brewing process. The carafe 121 stores the brewed beverage for subsequent dispensing. The carafe 121 comprises a second closed end 161, a second open end 162, a second one or more lateral faces 163, and an exterior screw thread 164.

The second closed end 161 is the closed end of the carafe 121. The second open end 162 is the open end of the carafe 121. The second one or more lateral faces 163 form the lateral face of the prism structure of the carafe 121. The exterior screw thread 164 forms a portion of the threaded connection that joins the containment pan 101 to the brewing pan 102. The exterior screw thread 164 is formed on the exterior surface of the second one or more lateral faces 163 of the carafe 121 at a position proximal to the second closed end 161. The exterior screw thread 164 is sized to screw into the interior screw thread 154 of the containment pan 101 to form the threaded connection.

The heating plate 122 is a disk-shaped plate structure. The heating plate 122 is a heat transfer structure. The heating plate 122 receives energy in the form of heat from the control circuit 104. The heating plate 122 transfers the heat received from the control circuit 104 to the heating tube 124 such that the heating plate 122 will heat the fluid contained in the brewing pan 102 as part of the brewing process. The heating plate 122 is formed with the apertures necessary to allow the dispensing valve 126 to draw fluid from the brewing pan 102 into the collapsible cup 112.

The feed tube 123 is a fluid transport structure. The feed tube 123 receives fluid from the exterior of the invention 100 and transports the received fluid directly into the carafe 121.

The heating tube 124 is a tube that transports fluid within the interior of the carafe 121. The heating tube 124 is formed from a heat conductive metal. The heating tube 124 is placed in direct contact with the heating plate 122. The fluid contained with the heating tube 124 is heated by the heating plate 122 such that the fluid is transported into the filter pan 127 during the brewing process.

The sight glass 125 is a transparent structure. The sight glass 125 mounts in the second one or more lateral faces 163 of the carafe 121 such that level of the fluid contained within the brewing pan 102 is visible from the exterior of the invention 100.

The dispensing valve 126 is a valve. The dispensing valve 126 mounts in the capped end of the capped tube structure of the carafe 121. The dispensing valve 126 forms a fluid port used to dispense the beverage contained within the brewing pan 102 into the collapsible cup 112. The dispensing valve 126 comprises a dispensing nozzle 171 and a release valve 172.

The dispensing nozzle 171 is a straight tubular structure. The dispensing nozzle 171 forms a fluid port used to transport the beverage through the carafe 121 into the collapsible cup 112. The dispensing nozzle 171 is controlled by the release valve 172. The release valve 172 is a ball valve. The release valve 172 controls the flow of the beverage from the carafe 121 through the dispensing nozzle 171. The release valve 172 rotates between an open and closed position.

The filter pan 127 is a pan shaped structure. The filter pan 127 is a foraminous structure that allows a fluid to pass through the filter pan 127. The filter pan 127 contains a surface filter used to contain a material from which organic material is extracted. The filter pan 127 passes the fluid into the carafe 121. The fluidic connection between the filter pan 127 and the carafe 121 is sealed using an elastomeric ring.

The lid structure 103 is a mechanical structure. The lid structure 103 is geometrically similar to the brewing pan 102. The lid structure 103 encloses the second open end 162 of the containment pan 101. The lid structure 103 attaches to the brewing pan 102 to form a composite prism structure. The lid structure 103 attaches to the brewing pan 102 such that the lid structure 103 rotates relative to the brewing pan 102 between an open position and a closed position. The lid structure 103 securely latches to the brewing pan 102 when the lid structure 103 is in a closed position. The lid structure 103 comprises a semispherical structure 131, a hinge 132, a latch 133, and a handle 134.

The semispherical structure 131 is a mechanical structure. The semispherical structure 131 has a semispherical shape. The semispherical structure 131 encloses the second open end 162 of the carafe 121. The base of the semispherical structure 131 is geometrically similar to the second open end 162 of the carafe 121.

The hinge 132 attaches the semispherical structure 131 to the second open end 162 of the carafe 121 such that the semispherical structure 131 rotates relative to the carafe 121. The hinge 132 attaches the semispherical structure 131 to the second open end 162 of the carafe 121 such that the base of the semispherical structure 131 encloses the second open end 162 of the carafe 121.

The latch 133 is a mechanical structure. The latch 133 secures the semispherical structure 131 to the second open end 162 of the carafe 121 when the semispherical structure 131 rotates into the closed position.

The handle 134 attaches to the exterior surface of the semispherical structure 131. The handle 134 forms a U-grip used to carry and manipulate the invention 100.

The control circuit 104 is an electric circuit. The control circuit 104 provides the energy necessary to brew the beverage. The control circuit 104 comprises a master switch 141, a brew switch 142, a timing circuit 143, a relay 144, a heating element 145, and an external power source 146. The master switch 141, the brew switch 142, the timing circuit 143, the relay 144, the heating element 145, and the external power source 146 are electrically interconnected.

The master switch 141 is a maintained electric switch. The master switch 141 controls the flow of electric energy from the external power source 146 into the balance of the control circuit 104. The brew switch 142 is a momentary switch. The brew switch 142 electrically connects to the timing circuit 143.

The timing circuit 143 monitors the brew switch 142. The timing circuit 143 is an electric circuit. The timing circuit 143 initiates the actuation of the relay 144 when the timing circuit 143 detects the actuation of the brew switch 142. The timing circuit 143 provides an electric signal to the relay 144 that closes the relay 144 such that electric energy flows from the master switch 141 into the heating element 145. In the first potential embodiment of the disclosure, the relay 144 is a transistor 181. The transistor 181 further comprises a collector 182, an emitter 183, and a base 184.

The transistor 181 operates as a switch. When a voltage is applied to the base 184, current will flow into the base 184 and the transistor 181 will act like a closed switch allowing current to flow from the collector 182 to the emitter 183. When the voltage is removed from the base 184, the transistor 181 will act like an open switch disrupting current flow from the collector 182 to the emitter 183.

The heating element 145 is an electric device. The heating element 145 is a resistive device that transfers heat energy into the heating plate 122.

The external power source 146 is an externally provided source of electric energy use to operate the control circuit 104.

The maintained switch, the momentary switch, the heating element 145, the timing circuit 143, the relay 144, the transistor 181 and the heating element 145 are defined elsewhere in this disclosure.

The following definitions were used in this disclosure:

90 Degree Elbow: As used in this disclosure, a 90 degree elbow is a two aperture fitting that attaches a first pipe to a second pipe such that the center axis of the first pipe is perpendicular to the center axis of the second pipe.

Accessory: As used in this disclosure, an accessory is a first object or first device that is configured for use with a second object or second device. The use of the accessory enhances the functionality of the second object or second device.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Ball Valve: As used in this disclosure, a ball valve is a type of valve. The flow of a fluid through a ball valve is controlled using a spherical structure with a cylindrical channel formed through it. When the center axis of the cylindrical channel is aligned with the center axis of the flow path of the ball valve, fluid will flow through the ball valve. When the center axis of the cylindrical channel is perpendicular to the center axis of the flow path of the ball valve, fluid will not flow through the ball valve.

Capped Tube: As used in this disclosure, a capped tube is a tube with one closed end and one open end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Closed Position: As used in this disclosure, a closed position refers to a movable barrier structure that is in an orientation that prevents passage through a port or an aperture. The closed position is often referred to as an object being "closed." Always use orientation.

Collapsible: As used in this disclosure, the terms collapsible refers to an object that is configured such that the volume of the object is adjustable. The verb collapse means that the volume of the object is adjusted from a larger volume to a smaller volume. The verbs expand and deploy mean that the volume of the object is adjusted from a smaller volume to a larger volume.

Composite Prism: As used in this disclosure, a composite prism refers to a structure that is formed from a plurality of structures selected from the group consisting of a prism structure, a pyramid structure, and a spherical structure. The plurality of selected structures may or may not be truncated. The plurality of prism structures are joined together such that the center axes (or spherical diameter) of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Control Circuit: As used in this disclosure, a control circuit is an electrical circuit that manages and regulates the behavior or operation of a device.

Correspond: As used in this disclosure, the term correspond is used as a comparison between two or more objects wherein one or more properties shared by the two or more objects match, agree, or align within acceptable manufacturing tolerances.

Cup: As used in this disclosure, a cup is a container that is intended to contain a fluid. The cup has a shape that roughly corresponds to a capped tube. Glass, mug, stein, and tumbler are synonyms for a cup.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Exterior: As used in this disclosure, the exterior is used as a relational term that implies that an object is not contained within the boundary of a structure or a space.

Exterior Screw Thread: An exterior screw thread is a ridge wrapped around the outer surface of a tube in the form of a helical structure that is used to convert rotational movement into linear movement.

External Power Source: As used in this disclosure, an external power source is a source of the energy that is externally provided to enable the operation of the present disclosure. Examples of external power sources include, but are not limited to, electrical power sources and compressed air sources.

Filter: As used in this disclosure, a filter is a mechanical device that is used to separate solids that are suspended in a liquid or a gas. A strainer is type of filter with what would be considered a coarse mesh measurement.

Fluid Port: As used in this disclosure, a fluid port is an opening formed in an object that allows fluid to flow through the boundary of the object.

Foraminous: As used in this disclosure, foraminous is an adjective that describes a surface, plate, or platform that is perforated with a plurality of apertures.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grip: As used in this disclosure, a grip is an accommodation formed on or within an object that allows the object to be grasped or manipulated by a hand.

Handle: As used in this disclosure, a handle is an object by which a tool, object, or door is held or manipulated with the hand.

Heating Element: As used in this disclosure, a heating element is a resistive wire that is used to convert electrical energy into heat. Common metal combinations used to form heat elements include a combination of nickel and Chromium (typical: 80/20), a combination of iron, chromium and aluminum (typical 70/25/5), a combination of copper, nickel, iron, and manganese (typical 66/30/2/2) (use for continuously hot), and platinum.

Helix: As used in this disclosure, a helix is the three-dimensional structure that would be formed by a wire that is wound uniformly around the surface of a cylinder or a cone. If the wire is wrapped around a cylinder the helix is called a cylindrical helix. If the wire is wrapped around a cone, the helix is called a conical helix. A synonym for conical helix would be a volute.

Hinge: As used in this disclosure, a hinge is a device that permits the turning, rotating, or pivoting of a first object relative to a second object. A hinge designed to be fixed into a set position after rotation is called a locking hinge.

Inner Dimension: As used in this disclosure, the term inner dimension describes the span from a first inside or interior surface of a container to a second inside or interior surface of a container. The term is used in much the same way that a plumber would refer to the inner diameter of a pipe.

Insulating Material: As used in this disclosure, an insulating material is a material that inhibits, and ideally prevents, the transfer of heat through the insulating material. Insulating materials may also be used to inhibit or prevent the transfer of sound or the conduction of electricity through the insulating material. Methods to form insulating materials include, but are not limited to: 1) the use of materials with low thermal conductivity; and, 2) the use of a structural design that places a vacuum within the insulating material within the anticipated transfer path of the heat, sound, or electric current flow.

Insulating Structure: As used in this disclosure, an insulating structure is a structure that inhibits, and ideally prevents, the transfer of heat through the insulating structure. Insulating structures may also be used to inhibit or prevent the transfer of sound through the insulating structure. Methods to form insulating structures include, but are not limited to: 1) the use of materials with low thermal conductivity; and, 2) the use of a structural design that places a vacuum within the insulating structure within the anticipated transfer path of the heat or sound.

Interior: As used in this disclosure, the interior is used as a relational term that implies that an object is contained within the boundary of a structure or a space.

Interior Screw Thread: An interior screw thread is a groove that is formed around the inner surface of a tube in the form of a helical structure that is used to convert rotational movement into linear movement.

Latch: As used in this disclosure, a latch is a fastening or locking mechanism. The use of the term latch does not necessarily but often implies the insertion of an object into a notch or cavity.

Maintained Switch: A used in this disclosure, a maintained switch is a switch that maintains the position that was set in the most recent switch actuation. A maintained switch works in an opposite manner to a momentary switch.

Momentary Switch: As used in this disclosure, a momentary switch is a biased switch in the sense that the momentary switch has a baseline position that only changes when the momentary switch is actuated (for example when a pushbutton switch is pushed or a relay coil is energized). The momentary switch then returns to the baseline position once the actuation is completed. This baseline position is called the "normal" position. For example, a "normally open" momentary switch interrupts (open) the electric circuit in the baseline position and completes (closes) the circuit when the momentary switch is activated. Similarly, a "normally closed" momentary switch will complete (close) an electric circuit in the baseline position and interrupt (open) the circuit when the momentary switch is activated.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Open Position: As used in this disclosure, an open position refers to a movable barrier structure that is in an orientation that allows passage through a port or an aperture. The open position is often referred to as an object being "open."

Orientation: As used in this disclosure, orientation refers to the positioning of a first object relative to: 1) a second object; or, 2) a fixed position, location, or direction.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Pan: As used in this disclosure, a pan is a hollow containment structure. The pan has a shape selected from the group consisting of: a) a prism; and, b) a truncated pyramid. The pan has a single open face. The open face of the pan is often, but not always, the superior face of the pan. The open face is a surface selected from the group consisting of: a) congruent end of the prism structure that forms the pan; b) a lateral face of the prism structure that forms the pan, c) the base face of the truncated pyramid structure; and, d) the truncated face of the truncated pyramid structure. A semi-enclosed pan refers to a pan wherein an end of prism structure of the pan and a portion of the lateral face of the pan is also open.

Perimeter: As used in this disclosure, a perimeter is one or more curved or straight lines that bounds an enclosed area on a plane or surface. The perimeter of a circle is commonly referred to as a circumference.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Relay: As used in this disclosure, a relay is an automatic electronic, electromagnetic or electromechanical device that reacts to changes in voltage or current by opening or closing a switch in an electric circuit. Relays are further defined with a coil and a switch. Applying a voltage to the coil, usually referred to as energizing the coil, will cause the coil to change the position of the switch. This definition is not intended to preclude the substitution of a transistor for a relay. Within this disclosure, a transistor can be considered as a relay. In this scenario, the base voltage is analogous to the coil of the relay and the current flow from the collector to the emitter is analogous to the operation of the switch of the relay. Those skilled in the electrical arts will recognize that this substitution can be made without undue experimentation. The transistor is defined in greater detail elsewhere in this disclosure.

Screw: As used in this disclosure, to screw is a verb meaning: 1) to fasten or unfasten (unscrew) a threaded connection; or 2) to attach a helical structure to a solid structure.

Semisphere: As used in this disclosure, a semisphere is a structure formed in the shape of a half a sphere. Such a structure would be described as semispherical.

Sphere: As used in this disclosure, a sphere refers to a structure wherein every point of the surface of the structure is equidistant from a center point.

Surface Filter: As used in this disclosure, a surface filter is a type of filter wherein the fluid is passed through a surface or membrane, such as a screen or paper that allows for the passage of the fluid but blocks the passage of larger particles that may be suspended in the fluid. The construction of a surface filter would allow for the passage of the fluid through several filter surfaces in one filtration unit.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Threaded Connection: As used in this disclosure, a threaded connection is a type of fastener that is used to join a first cylindrical object and a second cylindrical object together. The first cylindrical object is fitted with a first fitting selected from an interior screw thread or an exterior screw thread. The second cylindrical object is fitted with the remaining screw thread. The cylindrical object fitted with the exterior screw thread is placed into the remaining cylindrical object such that: 1) the interior screw thread and the exterior screw thread interconnect; and, 2) when the cylindrical object fitted with the exterior screw thread is rotated the rotational motion is converted into linear motion that moves the cylindrical object fitted with the exterior screw thread either into or out of the remaining cylindrical object. The direction of linear motion is determined by the direction of rotation.

Transistor: As used in this disclosure, a transistor is a general term for a three terminal semiconducting electrical device that is used for electrical signal amplification and electrical switching applications. There are several designs of transistors. A common example of a transistor is an NPN transistor that further comprises a collector terminal, an emitter terminal, and a base terminal and which consists of a combination of two rectifying junctions (a diode is an example of a rectifying junction). Current flowing from the collector terminal through the emitter terminal crosses the two rectifier junctions. The amount of the electric current crossing the two rectified junctions is controlled by the amount of electric current that flows through the base terminal. This disclosure assumes the use of an NPN transistor. This assumption is made solely for the purposes of simplicity and clarity of exposition. Those skilled in the electrical arts will recognize that other types of transistors, including but not limited to, field effect transistors and PNP transistors, can be substituted for an NPN transistor without undue experimentation.

Truncated: As used in this disclosure, a geometric object is truncated when an apex, vertex, or end is cut off by a line or plane.

Tube: As used in this disclosure, the term tube is used to describe a rigid hollow prism-shaped device with two open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

U-Grip: As used in this disclosure, a U-Grip is a U-shaped structure that attaches to a surface to form a graspable handle.

U-Shaped Structure: As used in this disclosure, a U-shaped structure refers to a three-sided structure comprising a crossbeam, a first arm, and a second arm. In a U-shaped structure, the first arm and the second arm project away from the crossbeam: 1) in the same direction; 2) at a roughly perpendicular angle to the crossbeam, and, 3) the span of the length of the first arm roughly equals the span of the length of the second arm.

Valve: As used in this disclosure, a valve is a device that is used to control the flow of a fluid (gas or liquid) through a pipe, tube, or hose.

With respect to the above description, it is to be realized that the optimum dimensional relationship for the various components of the invention described above and in FIGS. 1 through 8 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A portable coffee brewer comprising
a containment pan, a brewing pan, a lid structure, and a control circuit;
wherein the lid structure and the containment pan attach to the brewing pan;
wherein the control circuit mounts in the brewing pan;
wherein the portable coffee brewer is configured for use in brewing a beverage;
wherein the control circuit controls the operation of the portable coffee brewer;
wherein the lid structure encloses the brewing pan;
wherein the beverage pan forms the space within which the beverage is brewed;
wherein the brewing pan comprises a carafe, a heating plate, a feed tube, a heating tube, a sight glass, a dispensing valve, and a filter pan;
wherein the dispensing valve is a valve;
wherein the dispensing valve mounts in the second one or more lateral faces of the carafe;
wherein the dispensing valve comprises a dispensing nozzle and a release valve;
wherein the dispensing nozzle forms a fluid port used to transport the beverage through the capped end of the capped tube structure of the carafe into the collapsible cup;
wherein the dispensing nozzle attaches to the release valve;
wherein the release valve is a ball valve;
wherein the release valve controls the flow of the beverage from the carafe into the dispensing nozzle;
wherein the release valve rotates between an open and closed position.

2. The portable coffee brewer according to claim 1 wherein the control circuit heats and circulates a fluid stored within the beverage pan.

3. The portable coffee brewer according to claim 2
wherein the containment pan is a prism-shaped structure;
wherein the containment pan has a capped tube structure;
wherein the containment pan attaches to the brewing pan using a threaded connection.

4. The portable coffee brewer according to claim 3
wherein the brewing pan is a prism-shaped structure;
wherein the brewing pan has a capped tube structure;
wherein the brewing pan is a fluid impermeable structure;
wherein the brewing pan is geometrically similar to the containment pan.

5. The portable coffee brewer according to claim 4 wherein the containment pan attaches to the brewing pan to form a composite prism structure.

6. The portable coffee brewer according to claim 5
wherein the lid structure is a mechanical structure;
wherein the lid structure is geometrically similar to the brewing pan;
wherein the lid structure encloses the second open end of the containment pan;
wherein the lid structure attaches to the brewing pan to form a composite prism structure;
wherein the lid structure attaches to the brewing pan such that the lid structure rotates relative to the brewing pan between an open position and a closed position;
wherein the lid structure securely latches to the brewing pan when the lid structure is in a closed position.

7. The portable coffee brewer according to claim 6
wherein the containment pan comprises a first capped tube, a collapsible cup, and an accessory set;
wherein the first capped tube contains the collapsible cup and the accessory set.

8. The portable coffee brewer according to claim 7
wherein the carafe forms the physical containment space of the brewing pan;
wherein the heating plate is a heat transfer structure;
wherein the heating plate receives energy in the form of heat from the control circuit;
wherein the feed tube receives fluid from the exterior of the portable coffee brewer and transports the received fluid directly into the carafe;
wherein the heating tube is a tube that transports fluid within the interior of the carafe;

wherein the sight glass mounts in the carafe such that level of the fluid contained within the brewing pan is visible from the exterior of the portable coffee brewer;

wherein the dispensing valve forms a fluid port used to dispense the beverage contained within the brewing pan into the collapsible cup;

wherein the filter pan is a pan shaped structure;

wherein the filter pan is a foraminous structure that allows a fluid to pass through the filter pan.

9. The portable coffee brewer according to claim 8 wherein the lid structure comprises a semispherical structure, a hinge, a latch, and a handle;

wherein the hinge attaches the semispherical structure to the second open end of the carafe such that the semispherical structure rotates relative to the carafe;

wherein the hinge attaches the semispherical structure to the second open end of the carafe such that the base of the semispherical structure encloses the second open end of the carafe;

wherein the latch secures the semispherical structure to the second open end of the carafe when the semispherical structure rotates into the closed position;

wherein the handle attaches to the exterior surface of the semispherical structure.

10. The portable coffee brewer according to claim 9 wherein the first capped tube is a prism-shaped structure;

wherein the first capped tube has a capped tube structure;

wherein the first capped tube forms the physical containment space of the containment pan;

wherein the first capped tube comprises a first closed end, a first open end, a first one or more lateral faces, and an interior screw thread;

wherein the first closed end is the closed end of the first capped tube;

wherein the first open end is the open end of the first capped tube;

wherein the first one or more lateral faces form the lateral face of the prism structure of the first capped tube;

wherein the interior screw thread forms a portion of the threaded connection that joins the containment pan to the brewing pan;

wherein the interior screw thread is formed on the interior surface of the first one or more lateral faces of the first capped tube at a position proximal to the first open end.

11. The portable coffee brewer according to claim 10 wherein the collapsible cup is a cup;

wherein the collapsible cup is configured for use in consuming the beverage brewed by the portable coffee brewer;

wherein the collapsible cup is collapsible such that the volume of the collapsible cup is reducible before storage in the containment pan;

wherein the accessory set is contained within the first capped tube.

12. The portable coffee brewer according to claim 11 wherein the carafe is a prism-shaped structure;

wherein the carafe has a capped tube structure;

wherein the carafe is a fluid impermeable structure.

13. The portable coffee brewer according to claim 12 wherein the carafe comprises a second closed end, a second open end, a second one or more lateral faces, and an exterior screw thread;

wherein the second closed end is the closed end of the carafe;

wherein the second open end is the open end of the carafe;

wherein the second one or more lateral faces form the lateral face of the prism structure of the carafe;

wherein the exterior screw thread forms a portion of the threaded connection that joins the containment pan to the brewing pan;

wherein the exterior screw thread is formed on the exterior surface of the second one or more lateral faces of the carafe at a position proximal to the second closed end;

wherein the exterior screw thread is sized to screw into the interior screw thread of the containment pan to form the threaded connection.

14. The portable coffee brewer according to claim 13 wherein the heating plate is a disk-shaped plate structure;

wherein the heating plate transfers the heat received from the control circuit to the heating tube such that the heating plate will heat the fluid contained in the brewing pan as part of the brewing process.

15. The portable coffee brewer according to claim 14 wherein the feed tube is a fluid transport structure;

wherein the heating tube is formed from a heat conductive metal;

wherein the heating tube is placed in direct contact with the heating plate;

wherein the fluid contained with the heating tube is heated by the heating plate such that the fluid is transported into the filter pan during the brewing process.

16. The portable coffee brewer according to claim 15 wherein the sight glass is a transparent structure;

wherein the sight glass mounts in the second one or more lateral faces of the carafe such that level of the fluid contained within the brewing pan is visible from the exterior of the portable coffee brewer.

17. The portable coffee brewer according to claim 16 wherein the semispherical structure is a mechanical structure;

wherein the semispherical structure has a semispherical shape;

wherein the semispherical structure encloses the second open end of the carafe;

wherein the base of the semispherical structure is geometrically similar to the second open end of the carafe.

18. The portable coffee brewer according to claim 17 wherein the control circuit comprises a master switch, a brew switch, a timing circuit, a relay, a heating element, and an external power source;

wherein the master switch, the brew switch, the timing circuit, the relay, the heating element, and the external power source are electrically interconnected.

19. The portable coffee brewer according to claim 18 wherein the master switch is a maintained electric switch;

wherein the master switch controls the flow of electric energy from the external power source into the balance of the control circuit;

wherein the brew switch is a momentary switch;

wherein the brew switch electrically connects to the timing circuit;

wherein the timing circuit monitors the brew switch;

wherein the timing circuit is an electric circuit;

wherein the timing circuit initiates the actuation of the relay when the timing circuit detects the actuation of the brew switch;

wherein the timing circuit provides an electric signal to the relay that closes the relay such that electric energy flows from the master switch into the heating element;

wherein the relay is a transistor;

wherein the heating element is an electric device;

wherein the heating element is a resistive device that transfers heat energy into the heating plate;

wherein the external power source is an externally provided source of electric energy use to operate the control circuit.

\* \* \* \* \*